(12) United States Patent
Lundström et al.

(10) Patent No.: US 6,848,333 B2
(45) Date of Patent: Feb. 1, 2005

(54) INDUSTRIAL ROBOT WITH A BALANCING DEVICE

(75) Inventors: Christer Lundström, Enköping (SE); Rafael Nissfolk, Västerås (SE)

(73) Assignee: ABB AB, Västerås (SE)

( * ) Notice: Subject to any disclaimer, the term of this patent is extended or adjusted under 35 U.S.C. 154(b) by 0 days.

(21) Appl. No.: 10/049,847
(22) PCT Filed: Dec. 8, 2000
(86) PCT No.: PCT/SE00/02469
  § 371 (c)(1),
  (2), (4) Date: May 30, 2002
(87) PCT Pub. No.: WO01/41978
  PCT Pub. Date: Jun. 14, 2001

(65) Prior Publication Data
  US 2002/0162414 A1 Nov. 7, 2002

(30) Foreign Application Priority Data
  Dec. 9, 1999 (SE) .............................. 9904500

(51) Int. Cl.⁷ .............................................. B25J 17/00
(52) U.S. Cl. ...................................... 74/490.05; 901/48
(58) Field of Search ...................... 74/490.01, 490.05; 901/48

(56) References Cited

U.S. PATENT DOCUMENTS

| | | | |
|---|---|---|---|
| 4,592,697 A | | 6/1986 | Tuda et al. |
| 5,402,690 A | * | 4/1995 | Sekiguchi et al. ........ 74/490.01 |
| 6,145,403 A | * | 11/2000 | Aschenbrenner et al. 74/490.01 |
| 6,564,667 B2 | * | 5/2003 | Bayer et al. ............. 74/490.01 |
| 2001/0022112 A1 | * | 9/2001 | Bayer et al. ............. 74/490.01 |
| 2003/0106390 A1 | * | 6/2003 | Bohlken ................... 74/490.01 |

FOREIGN PATENT DOCUMENTS

| | | |
|---|---|---|
| EP | 0947296 | 10/1999 |
| JP | 10-225891 | 8/1998 |

* cited by examiner

Primary Examiner—David Fenstermacher
(74) Attorney, Agent, or Firm—Venable LLP; Eric J. Franklin

(57) ABSTRACT

Industrial robot arranged with a helical spring based balancing system, which is able to stand up to high load.

15 Claims, 5 Drawing Sheets

INDUSTRIAL ROBOT WITH A BALANCING DEVICE

TECHNICAL FIELD

The present invention relates to an industrial robot with an equalizing device, comprising a helical spring, and a method for balancing and use of the robot.

BACKGROUND

In industrial robots, comprising two robot parts pivotally arranged relative each other, powerful power consuming motors, which execute the pivoting of the robot, are required. Powerful power consuming motors are large, heavy and expensive, which commands a need of alternative solutions. One alternative is to supplement the robot with a device, which in the pivoting of the robot participates in the pivoting by absorbing the torque during the pivoting from a rest position/initial position, i.e. when the robot starts a work cycle. The concept pivoting from a rest position/initial position refers to a pivoting in a direction where the attraction of gravity contributes to the pivoting. The arrangement is of such a nature that it during the pivoting from the rest position generates a torque, which acts to restore the robot to its rest position/initial position and thereby helps/relieves the driving motor concerned during the lifting/pivoting back. The concept pivoting back to the rest position/initial position refers to a pivoting which counteracts and thereby compensates for the attraction of gravity, which pivoting in the following is designated balancing. The arrangement according to the foregoing is thus considered a balancing arrangement.

By arranging industrial robots with balancing arrangements, which help and relieve the driving motors, the robot manufacturer is not forced to install unnecessarily large and powerful motors in the robot. The opposite also applies, a powerful driving motor in combination with a powerful balancing arrangement increases the lifting capacity in the wrist of a large industrial robot. However, this leads to an increase in dead weight of both the motor and the balancing arrangement, which in turn calls for even bigger demands on the driving motor in question.

A balancing arrangement thus helps the motor concerned to counterbalance the applied handling weight as well as the present dead weight when pivoting occurs during operation of the robot. Balancing arrangements generally consist of weights, gas-hydraulic devices or spring devices in the form of helical springs, torsion springs and/or gas-based balancing cylinders. Apart from the counterweights the above mentioned devices are expensive, heavy and sensitive constructions. Gashydraulic devices are space demanding and are furthermore marred by density problems.

In helical spring-based balancing cylinders there is always a risk for obliquity of the piston rod in relation to the cylinder, the so-called drawer effect, which when it arises leads to wear of the cylinder device and drastically shortened life-time. The alternative with counterweights also results in disadvantages, because a robot with a counterweight can not be as compact and space-saving. The counterweight also restrains the freedom of movement of the robot. When the robot performs overly limited motion cycles, i.e. the robot is moving too little, problems with poor lubrication in the integral bearings arise.

The Japanese patent JP 10015874 discloses a robot arranged with a gravitation compensating spring device. The device comprises a spring housing, which includes a helical spring, a spring seat and a pull rod attached to the spring seat. Three guide pins are each arranged through a separate hole in the spring seat, which glides along the guide pins when the pull rod is pulled out and the helical spring by that is compressed. The aim is to prevent damage on the pull rod.

Industrial robots usually consist of a robot foot, a stand and a robot arm. The stand is rotatably arranged on the robot foot. The robot arm is pivotably arranged in a joint on the stand. The robot arm is composed of arm parts pivotably arranged in relation to each other. The robot arm comprises e.g. a first and a second arm part and also a wrist arranged with a tool attachment. The arm in its initial position/rest position is oriented with the first arm part almost vertical. When the robot is moving/in operation the arm pivots in relation to the stand at the same time as the arm parts pivots in relation to each other.

The total load on the robot consists of the applied handling weight in the wrist on one hand and the present dead weight of the robot on the other. In pivoting, the motor in question pivots the robot arm, and the the gravity acting on the arm loads/influences the balancing arrangement, whereby the balancing arrangement generates a torque.

The balancing arrangement then facilitates for the motor to pivot the arm back to its initial position/rest position. The pivot motor in question must thus, in pivoting the robot back, be able to handle a remaining torque, which is the sum of the moment from the total load as well as the oppositely directed torque generated in the balancing arrangement. The torque generated by the balancing arrangement and the power of the concerned pivot motor are thus in a state of dependence.

The development of industrial robots is moving towards ever larger robots. 10 years ago large robots managed to lift up to 100 kg with the wrist. The further development has made lifts of 200 kg possible and now there is a need to increase the lifting capacity in the wrist to extremely high loads of approximately 250 kg. With as high loads as that in the wrist, it is immensely important that a balancing arrangement works in the right manner.

In balancing arrangements comprising helical springs the helical spring is compressed or extended. When a helical spring is compressed there is always the risk that it deflects sideways i.e. bends/collapses. It must thus be prevented that the helical spring bends.

With loads on the robot of up to 250 kg in the wrist a balancing arrangement is forced to work with very large torque forces and is easily damaged. The damages usually originate through imbalance in the load of the balancing arrangement. In the case with a helical spring, spring housing, spring seat and a pull rod an imbalance in the load of the pull rod, so-called drawer effect, leads to obliquity of the pull rod in the spring housing, wear appears and the expected life-time of the balancing arrangement is reduced to an unacceptably low level. This leads to unwanted and expensive production interruptions. Furthermore there will also be extra unwanted cost for spare equipment.

In the arrangement according to the above mentioned Japanese patent the spring seat cannot turn axially in the spring housing. Load leads to large bending moments in the pull rod part in the spring housing, which results in very high strain in the construction, high surface pressures are generated and all this taken together results in the deflection of the pull rod.

Consequently, when producing industrial robots of the kind described above the need of a balancing arrangement arises, which can manage loads up to 250 kg and at the same time has as long expected life-time as the industrial robot. Thereby unwanted production interruptions and the need of spare parts is eliminated.

Those needs cannot be fulfilled by the balancing arrangement according to the above mentioned Japanese patent.

DESCRIPTION OF THE INVENTION

An industrial robot, comprising a manipulator with a control system, presents a robot foot, a stand and a robot arm with a wrist and a tool. The stand is pivotably arranged on the robot foot. The robot arm is pivotably arranged on the stand in a joint. The robot arm is composed of at least a first and a second arm part and also the wrist, all of which are pivotably arranged in relation to each other. A balancing arrangement is arranged to exert, when the robot is pivoted, a pulling force between a first and a second robot part and thereby to compensate for/balance the attraction of gravity when the relative position of the robot parts changes. The balancing arrangement is attached to the corresponding robot part with fastening devices.

The aim of the invention is to, arrange a helical spring based balancing arrangement on a robot as above, where the robot manages to lift 250 kg with its wrist without damaging the balancing arrangement. The aim of the invention is also to provide the robot with a balancing arrangement, which has as long life expectance as the robot. Consequently, the object of the invention is to improve, in a balancing arrangement according to above, the guiding of a pull rod in a spring housing and by that eliminate the risk of obliquity of the pull rod, the so-called drawer effect.

The solution according to the invention is characterized by the device specified in patent claim 1 with a balancing arrangement in the form of a helical spring based telescopic unit. A pull rod together with a guide tube form a telescopic unit., which is arranged between the robot parts and constitutes a support and a guide for the helical spring. When pivoting the robot the telescopic unit is extended or shortened at the same time as the guiding of the pull rod is improved in accordance with the independent method claim. Furthermore, the invention prevents that torque forces from the helical spring/springs spread to the telescopic unit, as the pull rod can pivot freely around its longitudinal axis, in accordance with the dependent claims. A robot according to the invention can be equipped with one or more balancing arrangements and preferably be arranged with a vertical robot arm in accordance with the independent utilization claim.

It is within the scope of the invention that the telescopic unit comprises more than two telescopic parts.

It is within the scope of the invention that the balancing arrangement according to the invention is arranged between arm parts in the robot, which are not directly connected.

It is within the scope of the invention that the robot is mounted in the ceiling or angularly mounted.

It is also within the scope of the invention that a robot is arranged in such a manner that the balancing arrangement is provided with spring seats, which are rigidly mounted on the respective attachments of the balancing arrangement, and that the telescopic unit extends coaxially through the spring set. When pivoting the robot both the telescopic unit and the helical spring unit are longitudinally pulled out.

In the solution according to the invention is also included that the robot is provided with one or more balancing arrangements.

It is within the scope of the invention that the spring housing is provided with aerating holes to eliminate pumping effects from the movement of the piston back and forth.

It is within the scope of the invention that a ring fastener is rotatingly arranged through a roller bearing.

It is within the scope of the invention that the described piston is replaced by another type of spring seat.

It is within the scope of the invention that the pull rod is a piston rod.

DESCRIPTION OF THE DRAWINGS

The invention will be explained in detail through a description of an embodiment of the invention in reference to the accompanying drawing, where FIG. 1 discloses a balancing arrangement according to the present invention with the pull rod retracted.

DESCRIPTION OF AN EMBODIMENT

Figure 1:
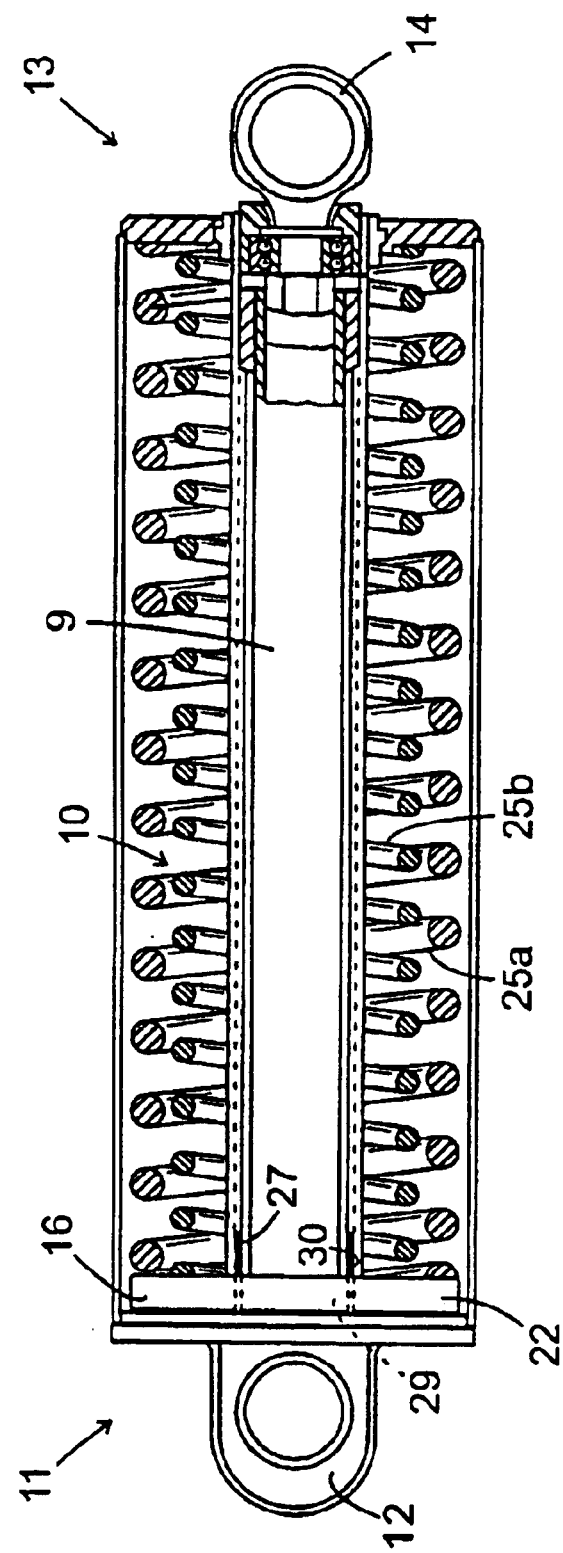
Figure 6:
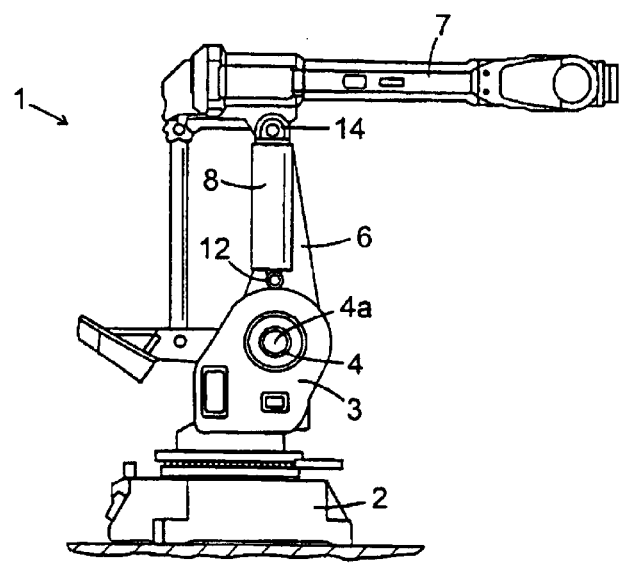
FIG. 6 discloses an industrial robot provided with a balancing arrangement according to the invention.

An industrial robot 1 (FIG. 6) comprises a robot foot 2, a stand 3 pivotably arranged on the robot foot 2 and a robot arm 5 connected to a joint 4 on the stand 3, which robot arm 5 comprises a first and a second arm part 6 and 7, respectively. The robot arm 5 is pivoted around a horisontal axis 4a of rotation in the joint 4. A balancing arrangement 8, comprising a telescopic unit 9 and a helical spring unit 10, is mounted on the robot 1 (FIG. 1). The helical spring unit 10 is coaxially arranged on the telescopic unit 9. The balancing arrangement 8 comprises in its first end 11 a first attachment 12 for pivoted mounting on the stand 3 and in its second end 13 a second attachment 14 for pivoted mounting on the first arm part 6.

Figure 2:
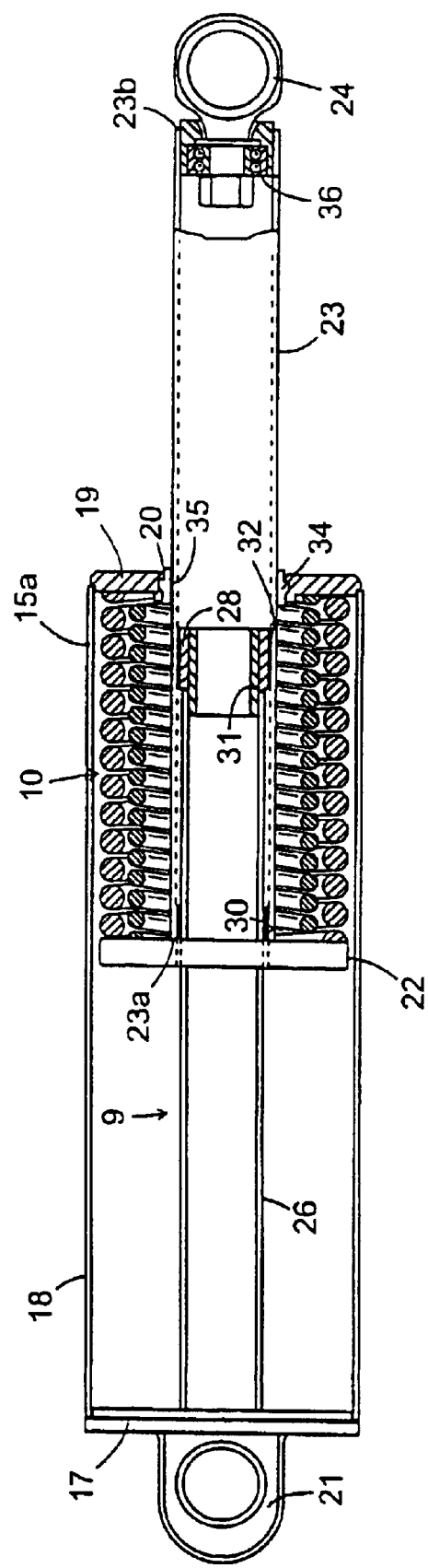
FIG. 2 discloses a balancing arrangement according to FIG. 1 with the pull rod pulled out.

The telescopic unit 9 comprises a first spring seat 15 and a second spring seat 16 between which the helical spring unit 10 is arranged (FIG. 2). The first spring seat 15 comprises a spring housing 15a, which is arranged with a first end 17, a cylindrical envelope surface 18 and also a second end 19, provided with an opening 20. A mounting 12 in the form of a first ring fastener 21 is arranged on the outside of the first gable 17. The second spring seat 16 comprises a piston 22, which is rigidly arranged at the first end 23a of a pull rod 23. The pull rod 23 together with the piston 22 are displaceably arranged inside the spring housing 15a. The tube-formed pull rod 23 extends from the piston 22, through a part of the spring housing 15a and out through the opening 20 in the second gable 19 of the spring housing 15a. The pull rod 23 is in its second end 23b provided with an attachment 14 in the form of a second ring fastener 24. The helical spring unit 10 comprises a spring set 25 in the form of two helical springs 25a and 25b which are arranged inside the spring housing 15a between the piston 22 and the second gable 19 of the spring housing 15a.

When the pull rod is pulled out of the spring housing 15a the spring set 25 is compressed and thereby generates a spring force, which strives to extend the helical spring set and thus retract the pull rod 23 back into the spring housing 15a. The generated spring force is used for the balancing.

Coaxially inside the spring housing 15a on the inside of the first gable 17 a guide-tube 26 is arranged. The guide tube 26 extends inside the spring housing 15a from the first gable 17 and almost to the second gable 19. The guide tube 26 thus has a length smaller than that of the spring housing 15a. The guide tube 26 has an outside diameter somewhat smaller than the inside diameter of the tube-formed pull rod 23.

Figure 3:
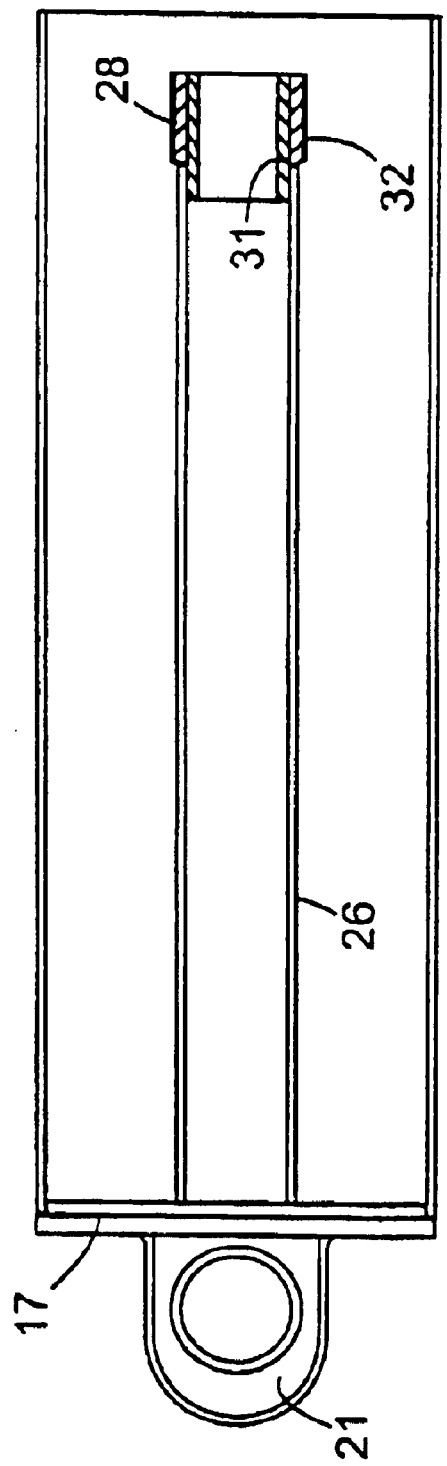
FIG. 3 discloses a balancing arrangement according to FIG. 1 without a helical spring and pull rod.

When the pull rod 23 is displaced along the guide tube 26 the pull rod 23 will glide with very good guiding and minimal friction along the guide tube 26. This is accomplished by a first and a second bushing 27 and 28. The first bushing 27 is rigidly arranged coaxially with and on the inside of the pull rod 23 and of an opening 29 in the spring seat 22 to form a longitudinal continous first guide surface 30 (FIG. 1). The second bushing 28 is rigidly arranged on the outside of the free end 31 of the guide tube 26, in order to form a longitudinal second guide surface 32 on the guide tube 26 (FIG. 3). When displacing the pull rod 23 the spring seat 22 slides along the guide tube 26

When the pull rod 23 is displaced through the opening 20 in the gable 19 it slides telescopically on the outside of the guide tube 26, which thus together form a telescopic unit 9. The movement is stabilized by the pull rod 23 being supported by the first 30 and the second 32 guide surfaces, which are arranged at a distance from each other longitudinally. The first 30 and the second 32 guide surfaces guide the pull rod 23 with a slip fit, which together with the guide tube 26 form a rigid unit 33 between the first 21 and the second 24 ring fasteners (FIG. 2).

A guide ring 34 is rigidly arranged in opening 20 of the second gable 19 of the spring housing 15a. The guide ring 34 is shaped with a third longitudinal guide surface 35 in the spring housing 15a. The third guide surface 35 guides and acts as a slide bearing to the pull rod 23 in its movement out of and into the spring housing 15a through the opening 20 (FIG. 2).

The possibility to compress the helical springs 25a and 25b arranged between the piston 22 and the second gable 19 of the spring housing 15a determines how far the pull rod 23 can be pulled out from the spring housing 15a. From the FIG. 2 it is clear that the guide tube 26 and the pull rod 23 are telescopically arranged within each other in sufficient degree to provide exact guiding and a good stability when the pull rod 23 is maximally pulled out. To secure that the pull rod 23 can be freely pivoted in the spring housing 15a the second ring fastener 24 is rotatably arranged in the second end 23b of the pull rod 23 through an angular ball bearing 36.

Figure 4A:
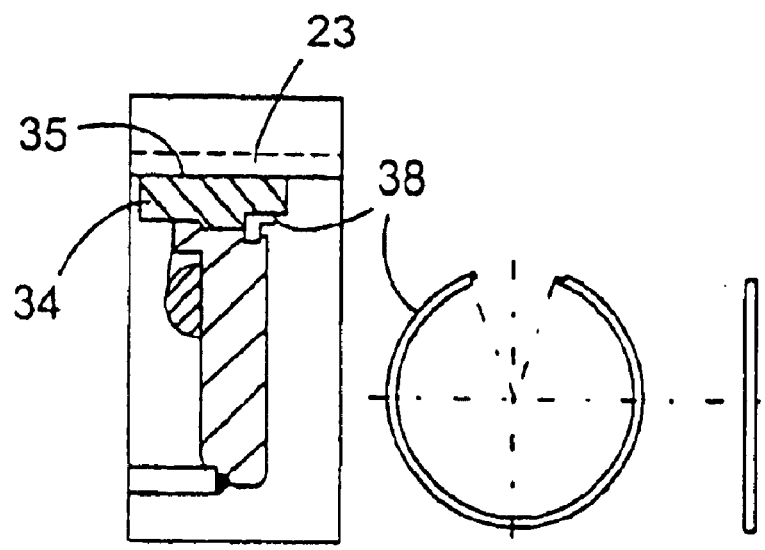
FIGS. 4a and 4b disclose a guide ring arranged in a spring housing opening.
Figure 4B:
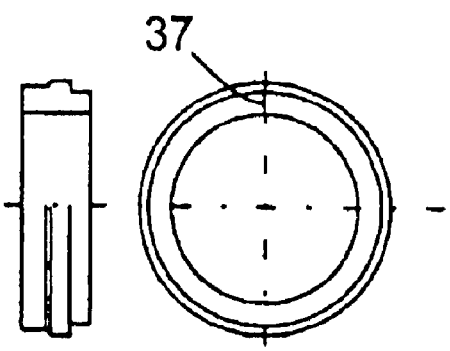
Figure 5:
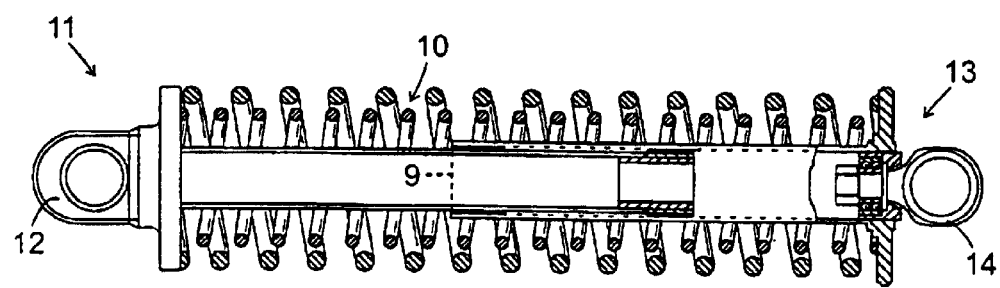
FIG. 5 discloses an alternative embodiment of the invention.

The guide ring 34 is detachably mounted coaxially in the opening 20 of the gable 19 (FIGS. 4a and 4b). The function of the guide ring 34 is primarily to guide the pull rod 23 through the third guide surface 35 and secondarily to seal or mark off the spring housing 15a. The guide ring 34 is easily replaceable. The guide ring 34 has an opening 37, which is slotted without material loss. It can thus easily be slipped on the pull rod 23 and guided axially to its intended position in the opening 20. A clamp ring 38 locks the guide ring 34 against axial displacement in the opening 20.

What is claimed is:

1. An industrial robot, comprising:
   a first robot part;
   a second robot part movably arranged with respect to the first robot part; and
   a balancing arrangement operatively connected to the first robot part and the second robot part to counteract gravity when the robot parts are pivoted, the balancing arrangement comprising
   a housing having a first end and a second end,
   a first attachment attached to the first end of the housing and a second attachment, the first attachment and the second attachment being operative to pivotably attach the balancing arrangement to the first robot part and the second robot part,
   a telescopic unit comprising a guide tube attached to a first end of the housing and a pull rod slidably arranged about the guide tube, wherein the second attachment is operatively connected to the guide tube,
   a first spring seat arranged at the second end of the housing,
   a second spring seat operatively connected to the pull rod, and
   a helical spring unit arranged between the first spring seat and the second spring seat.

2. The industrial robot according to claim 1, wherein the telescopic unit is arranged coaxially with the helical spring unit.

3. The industrial robot according to claim 1, wherein the guide tube comprises the first spring seat.

4. The industrial robot according to claim 1, wherein the pull rod comprises the second spring seat.

5. The industrial robot according to claim 1, wherein the first spring seat comprises a spring housing.

6. The industrial robot according to claim 5, wherein the guide tube is arranged coaxially in the spring housing surrounding the helical spring unit.

7. The industrial robot according to claim 5, wherein the pull rod is displaceably arranged on the exterior of the guide tube and extends with a first end out through an opening in the spring housing.

8. The industrial robot according to claim 1, wherein the first attachment is arranged freely rotatable in an end of the pull rod.

9. The industrial robot according to claim 7, further comprising:
   an exchangeable guide ring rigidly arranged in an opening of the spring housing.

10. The industrial robot according to claim 1, wherein the first robot part and the second robot part are vertically articulated arms.

11. A method of balancing an industrial robot, the method comprising:
   pivotably connecting a first robot part and a second robot;
   operatively connecting a balancing arrangement between the first robot part and the second robot part to counteract gravity when the robot parts are pivoted, the balancing arrangement comprising a housing having a first end and a second end, a first attachment attached to the first end of the housing and a second attachment, the first attachment and the second attachment being operative to pivotably attach the balancing arrangement to the first robot part and the second robot part, a telescopic unit comprising a guide tube attached to a first end of the housing and a pull rod slidably arranged about the guide tube, wherein the second attachment is operatively connected to the guide tube, a first spring seat arranged at the second end of the housing, a second spring seat operatively connected to the pull rod, and a helical spring unit arranged between the first spring seat and the second spring seat.

12. The method according to claim 11, wherein the telescopic unit guides the helical spring unit.

13. The method robot according to claim 11, wherein the helical spring unit is arranged coaxially on the telescopic unit.

14. The method according to claim 11, wherein the second attachment is applied in the form of a freely rotatable ring fastener.

15. Use of a method according to claim 11, with a vertically articulated robot arm.

* * * * *